No. 813,610. PATENTED FEB. 27, 1906.
H. ARON.
CLOCKWORK ELECTRICITY METER.
APPLICATION FILED JAN. 13, 1904.
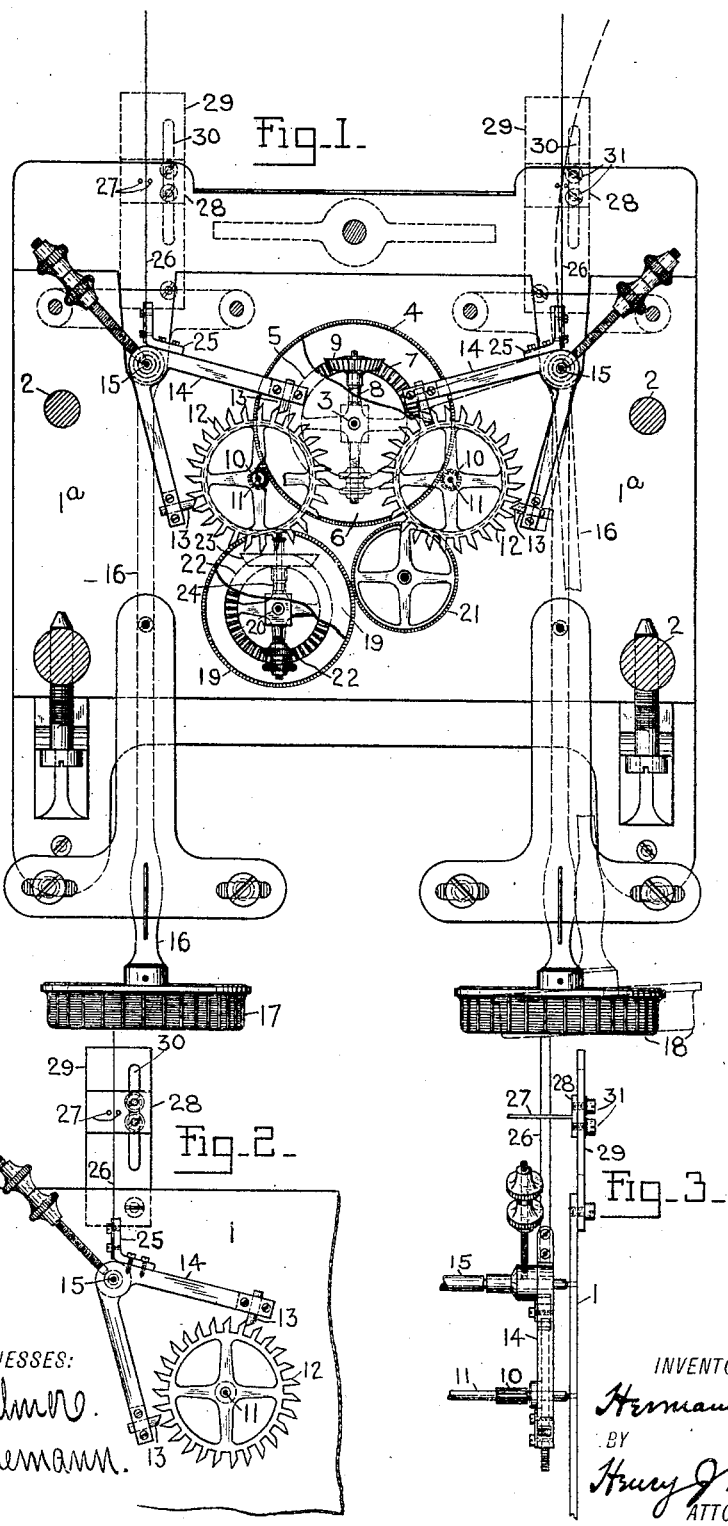
WITNESSES:
INVENTOR
Hermann Aron,
BY
Henry J. Miller,
ATTORNEY

UNITED STATES PATENT OFFICE.

HERMANN ARON, OF CHARLOTTENBURG, GERMANY.

CLOCKWORK ELECTRICITY-METER.

No. 813,610.   Specification of Letters Patent.   Patented Feb. 27, 1906.

Application filed January 13, 1904. Serial No. 188,850.

*To all whom it may concern:*

Be it known that I, HERMANN ARON, a citizen of the Empire of Germany, residing at 39 Wilmersdorferstrasse, Charlottenburg, in the Kingdom of Prussia and Empire of Germany, have invented certain new and useful Improvements in Clockwork Electricity-Meters, of which the following is a specification.

The present invention relates particularly to differential clockwork electric meters of the type commercially known as the "Aron electricity-meter," comprising a frame or casing for supporting the various parts of the mechanism and their electrical connections, automatically-actuated electrical winding mechanism for periodically winding up the spring-actuated clockwork mechanism, comprising two connected but independently-operative trains of transmission-gearing, each having an escapement controlled in its operation by a pendulum and connected with common recording devices and periodically-acting current and gearing reversing devices for insuring a continuous recording action of the instrument while compensating for slight mechanical variations in the differential transmission-trains by subjecting them to the effects of the electric currents passed through the coils in opposite directions, the two pendula carrying small shunt-coils of opposite polarity swinging to and fro adjacent the main coils in the load-circuit by the influence of which they are respectively retarded and accelerated with corresponding effect upon the transmission-trains controlled by the pendulum. In the practical installation and use of instruments of this character some difficulty has been experienced heretofore by reason of the setting up of the same slightly out of plumb, so that the neutral positions of the pendula when unsubjected to the influence of the several magnet-coils were slightly displaced from those normally occupied under the accurate installation of the instruments, while the extreme sensitiveness of the instruments for measuring light currents unfitted them for measuring currents of very much greater strength.

It is the object of the present invention partly to provide means of compensation for the defective installation of the instruments before referred to and partly to adapt such instruments for measuring with equal accuracy currents differing materially in strength.

In its preferred form the improvement is applied to the pendula of the meter forming the subject of my application, Serial No. 188,849, filed simultaneously herewith, each of the pendula carrying rigidly secured thereto a leaf-spring extending radially from the axis of suspension intermediate a pair of spaced guide-pins carried by a stationary block which is adjustable toward and from the axis of suspension of the pendulum. By this construction when the instrument is accurately installed the pendula uninfluenced by the controlling-magnets hang vertically with the springs intermediate their guide-pins and exerting no influence thereon; but in case the instrument should be set slightly inclined to normal position the action of the spring against one or the other of its guide-pins still causes the pendulum to assume substantially its neutral position under like conditions. Assuming that the guide-pins are set midway their extreme limits of adjustment to provide for the measurement of currents of medium strength, the shifting of such pins inwardly or outwardly to give their springs, respectively, greater or less influence upon the pendula evidently affords provision for the measurement of currents of greater or less strength.

The invention will be more fully understood by reference to the drawings annexed, in which—

Figure 1 is a front view of a portion of the clockwork mechanism of a meter of the type described with the front frame-plates removed to expose the escapement devices and their connections, the positions of the spring-guides and their supports being indicated in dotted lines. Fig. 2 is a rear side view of one of the escapement devices and its adjustable spring-controlling device with a portion of one of the supporting frame-plates therefor, and Fig. 3 an edge view of the same.

The clockwork mechanism is mounted in a frame constructed with parallel front plate 1, Fig. 2, and rear plate 1ª, Fig. 1, affording journals for the several spindles, which are connected by the usual shouldered studs 2. The mechanism comprises a spring-actuated rotary spindle 3, which is in practice driven by electrically-actuated winding mechanism, but may receive its motion from any suitable device. This spindle carries two loose sleeves the one provided with a spur-wheel 4 and bevel-wheel 5 and the other with a spur-wheel 6 and bevel-wheel 7, the spindle being provided intermediate the bevel-wheels 5 and 7 with a fixed radial arm 8, carrying the bevel planet-wheel 9, loosely mounted thereon, and meshing with the bevel-wheels 5 and 7. Each of the cog-wheels 4 and 6 meshes with a pinion 10, mounted upon a spindle 11, carrying an escapement-wheel 12, controlled in its rotation by the teeth 13 of the double-armed escapement-lever 14, mounted upon the rock-shaft 15, from which depends the pendulum-rod 16, the pendulum-rods carrying at their lower ends shunt-magnet coils 17 and 18 of opposite polarity, which are normally influenced by the main magnet-coils, of like polarity, through which the current to be measured flows.

The spindles 11 are connected, by means of suitable cog-wheels, with the cog-wheels 19, carried by loose sleeves mounted upon spindles 20, the one directly and the other through an intermediate gear 21, and each of these sleeves carries a bevel-gear 22, meshing with a bevel planet-gear 23, mounted upon a fixed radial arm 24, with which the spindle 20 is provided, whereby motions from the spindles 11 are transmitted to the bevel-gears 22 in opposite directions, and when such motions are equal they will result in the mere rotation of the planet-wheel 23 without communicating thereto bodily circular motion, while any difference of such communicated motion to the gears 19 and 22 will cause simultaneous rotating and revolving movements of the planet-gear 23 upon the fixed arm 24, with a resultant rotation of the spindle 20. In practice the spindle 20 is positively connected with a train of recording mechanism operating a series of pointers the positions of which in reference to their respective dials indicate the amount of current measured by the instrument. This recording mechanism is not specifically shown and described herein, as it forms no part of the present improvement.

Each of the double-armed levers 14 is provided at the junction of its arms and adjacent its point of support with an angle-piece 25, to which is rigidly secured a flat spring 26, extending radially from the said point of support and passing between two spaced guide-pins 27, carried by a block 28, secured upon a supporting-standard 29, carried by the frame-plate 1 and provided with a vertical slot 30, entered by the fastening and steadying screw-pins 31 for the block 28. It is evident that by loosening the screw-pins 31 the block 28 may be shifted to adjust the position of the guide-pins 27 in respect of the point of support of the pendula and the double-armed lever 14, whereby the effective length of the flat springs 26 is varied to produce a corresponding variation in the action of such spring upon the operation of the pendulum.

As represented in full lines in each of the figures of the drawings, the pendula are in their neutral positions intermediate the extreme limits of their vibrations; but in Fig. 1 the pendulum at the right is shown also in dotted lines in one of its extreme positions, with the consequent deflection of the spring 26, which obviously increases with the distance of the magnet-coil 18 from neutral position, thereby progressively increasing the resistance to such motion out of neutral position with a corresponding tendency to induce its return to such position.

While a flat spring, such as that represented in the drawings, is evidently the simplest means for producing the described progressive resistance to the movement of the pendulum in either direction from neutral position, it is evident that other forms of springs or spring-actuated or other devices may be readily employed for the same purpose, and it is therefore obvious that the present improvement is not limited to the specific construction and arrangement of parts shown and described herein. It is to be further understood that the term "flat" spring as employed herein is intended to include springs of any form of cross-section which yieldingly resist lateral deflection, as well as possessing the tendency to return to normal shape.

From the foregoing description it will be observed that the means for controlling the traverse of the pendula from neutral position are applied thereto and are adjustable entirely independently of their means of suspension, whereby the effective length of the pendula remains the same throughout all adjustments of the instrument for currents of different magnitude, the means of suspension upon a fixed fulcrum-bearing and means of control of their vibration performing their functions each independently of the others, while the action of the controlling means continues practically throughout the entire range of movement of each pendulum from neutral position. This evidently involves greater simplicity of construction and durability of the mechanism than is possessed by that of other instruments of this general class.

Having thus set forth the nature of the invention, what I claim herein is—

1. In an electric meter, the combination with a clockwork mechanism comprising an escapement device and a pendulum mounted upon a fixed fulcrum-bearing and free to vibrate freely thereon as a center in governing the action of said clockwork mechanism, of means additional to said fixed fulcrum-bearing and acting upon said pendulum substantially throughout its entire range of movement from neutral position with an intensity proportionate to its degree of deflection from and to restore it to said neutral position.

2. In an electric meter, the combination with a clockwork mechanism comprising an escapement device and a pendulum mounted upon a fixed fulcrum-bearing and free to vibrate freely thereon as a center in governing the action of said clockwork mechanism, of a spring secured to and carried by said pendulum adjacent its fulcrum-point and acting upon the same with an intensity proportionate to its degree of deflection from and to restore it to neutral position.

3. In an electric meter, the combination with a clockwork mechanism comprising an escapement device and a pendulum mounted upon a fixed fulcrum-bearing and free to vibrate freely thereon as a center in governing the action of said clockwork mechanism, of a spring secured to and carried by said pendulum adjacent its fulcrum-point, and means adjustable toward and from the fulcrum-point of said pendulum and adapted to engage said spring at a point removed from said fulcrum-point to confine it against bodily movement with said pendulum.

4. In an electric meter, the combination with the frame and a clockwork mechanism comprising an escapement device and a pendulum for controlling the operation of the same, of a flat spring rigidly connected with said pendulum, a guide embracing said spring, a block by which said guide is carried, mounted upon said frame adjustably toward and from the axis of suspension of said pendulum.

5. In an electric meter, the combination with the frame and a clockwork mechanism comprising an escapement device and a pendulum for controlling the operation of the same, of a flat spring rigidly connected with said pendulum, a supporting-standard carried by said frame, a sliding block secured upon said standard by a pin-and-slot connection adjustably toward and from the axis of suspension of said pendulum, and a pair of spaced guide-pins carried by said sliding block and embracing the said spring.

6. In an electric meter, the combination with a clockwork mechanism comprising two connected escapement devices and two pendula therefor, each of which controls the operation of its respective escapement device, of a flat spring rigidly connected with each of said pendula and guides adjustable toward and from the axes of suspension of their respective pendula through which said springs are extended.

In witness whereof I have hereunto set my hand in presence of two witnesses.

HERMANN ARON.

Witnesses:
   HENRY HASPER,
   WOLDEMAR HAUPT.